(12) United States Patent
Graef

(10) Patent No.: US 7,640,444 B2
(45) Date of Patent: Dec. 29, 2009

(54) SYSTEMS AND METHODS FOR LOW POWER BUS OPERATION

(76) Inventor: Nils Graef, 2009 Hoover Ave. Apartment E, Allentown, PA (US) 18109

(*) Notice: Subject to any disclaimer, the term of this patent is extended or adjusted under 35 U.S.C. 154(b) by 552 days.

(21) Appl. No.: 11/341,344

(22) Filed: Jan. 26, 2006

(65) Prior Publication Data

US 2007/0174643 A1 Jul. 26, 2007

(51) Int. Cl.
G06F 1/32 (2006.01)
(52) U.S. Cl. .................... 713/320; 713/300
(58) Field of Classification Search ............ 713/1–600; 710/5, 7
See application file for complete search history.

(56) References Cited

U.S. PATENT DOCUMENTS

| | | |
|---|---|---|
| 4,027,335 A | 5/1977 | Miller |
| 4,103,190 A | 7/1978 | Beutler |
| 4,104,735 A | 8/1978 | Hofmann et al. |
| 4,139,840 A | 2/1979 | Mogi |
| 4,176,287 A | 11/1979 | Remedi |
| 4,194,130 A | 3/1980 | Muench |
| 4,217,502 A | 8/1980 | Suzuki et al. |
| 4,233,667 A | 11/1980 | Devine et al. |
| 4,344,005 A | 8/1982 | Stewart |
| 4,414,480 A | 11/1983 | Zasio |
| 4,455,623 A | 6/1984 | Wesemeyer et al. |
| 4,546,456 A | 10/1985 | Buie |
| 4,667,337 A | 5/1987 | Fletcher |
| 6,335,718 B1 * | 1/2002 | Hong et al. ............ 345/98 |
| 6,671,212 B2 | 12/2003 | Macri et al. |
| 7,139,852 B2 * | 11/2006 | LaBerge ............ 710/100 |

OTHER PUBLICATIONS

Shiu, Da-shan et al., "Differential Pulse-Position Modulation for Power-Efficient Optical Communication", IEEE Transaction on Communications, vol. 47, No. 8, Aug. 1999.
Sotiriadis, Paul et al.,"Bus energy reduction by transition pattern coding using a detailed deep submicron bus model", IEEE Transaction on Circ. & Sys. I, vol. 50, No. 1, Oct. 2003.
Stan, Mircea R., Bus-Invert Coding for Low-Power I/O', IEEE Transactions on VLSI Systems, vol. 3, No. 1, Mar. 1995.
Stan, Mircea R. et al., "Two-Dimensional Codes for Low Power", ISLPED, 1996, Monterey, CA, USA.

* cited by examiner

*Primary Examiner*—Mark Connolly
*Assistant Examiner*—Paul B Yanchus, III
(74) *Attorney, Agent, or Firm*—Hamilton, DeSanctis & Cha

(57) ABSTRACT

Various systems and methods for power reduction are disclosed herein. As one example, a method for power reduction in a semiconductor device is disclosed. The method includes providing a semiconductor device that includes a bus. The bus includes a group of signals and a control signal associated with the group of signals. In one particular case, the group of signals is a data bus and the control signal is a low frequency signal implementing some particular control specific to the bus. In the method, the control signal doubles as a polarity control that indicates a polarity state of the group of signals while actively indicating the status of the particular control.

28 Claims, 3 Drawing Sheets

SYSTEMS AND METHODS FOR LOW POWER BUS OPERATION

BACKGROUND OF THE INVENTION

The present invention is related to systems and methods for reducing power consumption by semiconductor devices, and in particular to systems and methods for reducing dynamic power consumption.

A vast number of products rely on electrical circuits, and over the past two decades more and more of these products have been reduced in size and cost; and have in many cases become portable or mobile. In part because of this development, there has been a growing trend to reduce power consumption by the electrical circuits driving the products. Initially, this demand for reduced power resulted in the development of electrical circuit design types that inherently consumed less power. For example, emitter coupled logic (ECL) that originally provided high performance has become uncommon compared to complementary metal-oxide semiconductor (CMOS) designs that generally provide lower performance and substantially lower power consumption for a comparable design.

In current, prevailing design techniques, power consumption is proportional to switching frequency. Thus, for example, a design that includes one million transistors switching at one megahertz will consume much less power than the same design that is switching at ten megahertz. Based on this understanding, one approach for reducing power consumption has involved reducing the amount of switching required by a design, while still maintaining a high switching frequency to avoid a reduction in performance. In some cases, this can be achieved by adding additional control signals designed to allow the same level of throughput while reducing the amount of switching necessary. In some cases, however, such an approach is impractical for signals being transferred to or from a semiconductor device due to limitation on the number of available input/output pins. As power consumed by switching of external signals may be significant, this impracticality represents a substantial impediment to power reduction.

Hence, for at least the aforementioned reasons, there exists a need in the art for advanced systems and methods for reducing power consumption.

BRIEF SUMMARY OF THE INVENTION

The present invention is related to systems and methods for reducing power consumption by semiconductor devices, and in particular to systems and methods for reducing dynamic power consumption.

Some embodiments of the present invention provide methods for power reduction in a semiconductor device. Such methods include providing a semiconductor device that includes a bus having a group of signals, and a control signal associated with the group of signals. In the method, the control signal is actively indicating a particular control while doubles as a polarity control that indicates a polarity state of the group of signals. Such methods further include determining a number of state transitions occurring on the group of signals. Based at least in part on the determined number of state transitions, the group of signals is encoded to reflect the state of the polarity control.

In an exemplary embodiment, the particular control has a more likely state and a less likely state. The methods in such cases may include determining a set of conditions, and the encoding of the group of signals is based at least in part on the determined set of conditions. For example, where it is determined that the particular control is asserted in the more likely state, and the number of state transitions occurring on the group of signals is less than half of the number of signals included in the group of signals (i.e., <N/2); encoding the group of signals includes passing the group of signals through unmodified as the encoded group of signals. Where it is determined that the particular control is asserted in the more likely state, and the number of state transitions occurring on the group of signals is greater than half of the number of signals included in the group of signals (i.e., >N/2); encoding the group of signals includes inverting each signal in the group of signals to form an inverted signal group, and providing the inverted signal group as the encoded group of signals. Where it is determined that the particular control is asserted in the more likely state and was previously asserted in the more likely state, and the number of state transitions occurring on the group of signals is equal to half of the number of signals included in the group of signals (i.e., =N/2); encoding the group of signals includes passing the group of signals through unmodified as the encoded group of signals. Where it is determined that the particular control is asserted in the more likely state and was previously asserted in the less likely state, and the number of state transitions occurring on the group of signals is equal to half of the number of signals included in the group of signals; encoding the group of signals includes inverting each signal in the group of signals to form an inverted signal group, and providing the inverted signal group as the encoded group of signals.

Alternatively, where it is determined that the particular control is asserted in the less likely state, and the number of state transitions occurring on the group of signals is less than half of the number of signals included in the group of signals; encoding the group of signals includes inverting each signal in the group of signals to form an inverted signal group, and providing the inverted signal group as the encoded group of signals. Where it is determined that the particular control is asserted in the less likely state, and the number of state transitions occurring on the group of signals is greater than half of the number of signals included in the group of signals; encoding the group of signals includes passing the group of signals through unmodified as the encoded group of signals. Where it is determined that the particular control is asserted in the less likely state and was previously asserted in the more likely state, and the number of state transitions occurring on the group of signals is equal to half of the number of signals included in the group of signals; encoding the group of signals includes inverting each signal in the group of signals to form an inverted signal group, and providing the inverted signal group as the encoded group of signals. Where it is determined that the particular control is asserted in the less likely state and was previously asserted in the less likely state, and the number of state transitions occurring on the group of signals is equal to half of the number of signals included in the group of signals; encoding the group of signals includes inverting each signal in the group of signals to form an inverted signal group, and providing the inverted signal group as the encoded group of signals.

Various of the aforementioned methods further include receiving the encoded group of signals and the control signal indicating an inverted polarity. Based at least in part on the control signal, the encoded group of signals is decoded by inverting each signal in the encoded group of signals. In some of the aforementioned embodiments where the particular control has a more likely state and a less likely state, the methods further include receiving the encoded group of signals, and the control signal. A set of conditions are determined, and based upon the determined set of conditions, the control signal is decoded to recreate the original particular control. For example, where it is determined that the number of state transitions occurring on the group of signals is equal to half of the number of signals included in the group of signals, that the control signal was asserted in the more likely state during a preceding period, and that the control signal is currently asserted in the more likely state; decoding the control signal includes asserting the particular control signal in the more likely state. Alternatively, where it is determined that the number of state transitions occurring on the group of signals is equal to half of the number of signals included in the group of signals, that the control signal was asserted in the more likely state during a preceding period, and that the control signal is currently asserted in the less likely state; decoding the control signal includes asserting the particular control signal in the less likely state. As yet another alternative, where it is determined that the number of state transitions occurring on the group of signals is equal to half of the number of signals included in the group of signals, that the control signal was asserted in the less likely state during a preceding period, and that the control signal is currently asserted in the more likely state; decoding the control signal includes asserting the particular control signal in the more likely state. As yet a further alternative, where it is determined that the number of state transitions occurring on the group of signals is equal to half of the number of signals included in the group of signals, that the control signal was asserted in the less likely state during a preceding period, and that the control signal is currently asserted in the less likely state; decoding the control signal includes asserting the particular control signal in the less likely state. As yet an additional alternative, where it is determined that the number of state transitions occurring on the group of signals is less than half of the number of signals included in the group of signals; decoding the control signal includes asserting the particular control signal in the more likely state. Further, where it is determined that the number of state transitions occurring on the group of signals is greater than half of the number of signals included in the group of signals; decoding the control signal includes asserting the particular control signal in the less likely state.

Other embodiments of the present invention provide an interconnect bus device that includes a data bus with a number of data bits, and a control signal associated with the data bus. The control signal indicates a particular control and a polarity control simultaneously. The polarity control indicates a polarity state of the data bus, and the particular control indicates a bus control unrelated to the polarity control. In addition, the interconnect bus device includes a controller that is operable to: determine a number of state transitions occurring on the group of signals; encode the data bus to form an encoded group of signals, wherein encoding the group of signals is based at least in part on the number of state transitions occurring on the group of signals, and wherein the encoded group of signals reflects the state of the polarity control; and provide the encoded group of signals via the data bus.

Yet other embodiments of the present invention provide an interconnect bus device that includes a data bus with a number of data bits, and a control signal associated with the data bus. The control signal indicates a particular control and a polarity control simultaneously. The polarity control indicates a polarity state of the data bus, and the particular control indicates a bus control unrelated to the polarity control. In addition, the interconnect bus device includes a controller that is operable to: receive an encoded group signals via the data bus; receive the control signal; determine a number of state transitions occurring on the encoded group of signals; decode the control signal based at least in part on the determined number of state transitions occurring on the encoded group of signals; and decode the encoded group of signals based at least in part on the control signal.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
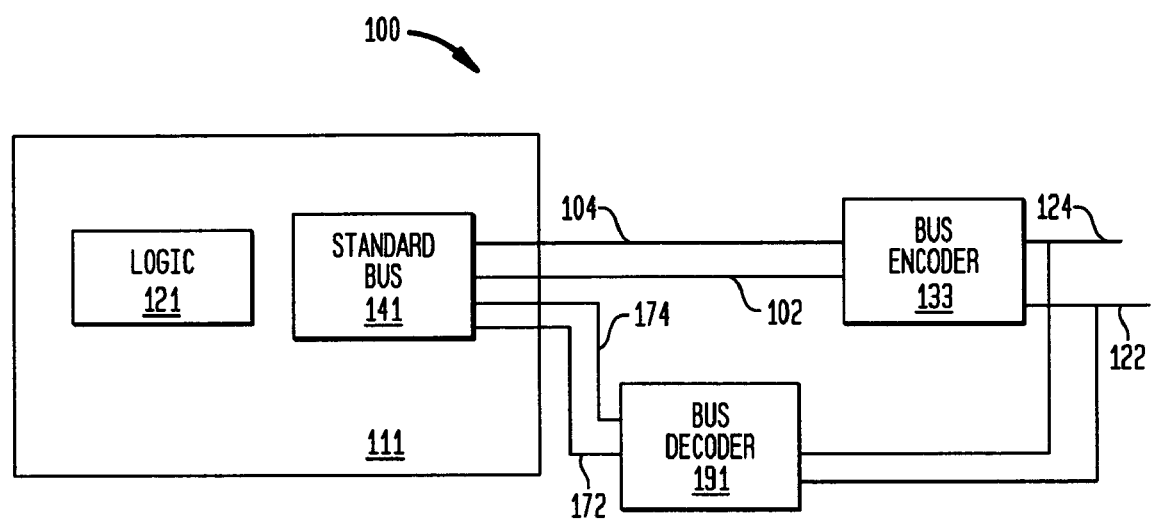
FIG. 1a is a block diagram of a low power bus system in accordance with various embodiments of the present invention.

The present invention is related to systems and methods for reducing power consumption by semiconductor devices, and in particular to systems and methods for reducing dynamic power consumption.

Various embodiments of the present invention use an existing bus pin that offers a relatively low transition activity to double as a polarity signal. The polarity signal allows data lines (and in some case other signal lines) associated with the bus to be inverted in an encoder, and re-inverted by a decoder. This inversion and re-inversion can be used to limit the number of transitions occurring on the bus lines, and thereby reduce the amount of dynamic power consumed in bus transmissions. As just one of the many advantages of such embodiments of the present invention, dynamic power consumption can be reduced without requiring the addition of another bus pin to act as a polarity signal. Based on the disclosure provided herein, one of ordinary skill in the art will recognize other advantages that may be achieved using one or more embodiments of the present invention.

Some embodiments of the present invention include providing a semiconductor device that includes a bus having a group of signals, and a control signal associated with the group of signals. In one particular case, the group of signals is a data bus and the control signal is a low frequency signal implementing some particular control specific to the bus. Based on the disclosure provided herein, however, one of ordinary skill in the art will recognize that the group of signals may be any collection of signals that are switched with at least some degree of synchronization, and that the control signal may be any other signal that is switched with at least some degree of synchronization to the group of signals. In the method, the control signal doubles as a polarity control that indicates a polarity state of the group of signals. Such methods further include determining a number of state transitions occurring on the group of signals. Based at least in part on the determined number of state transitions, the group of signals is encoded to reflect the state of the polarity control. Thus, in some cases, where the polarity control indicates a positive assertion, the group of signals are passed through unmodified. Alternatively, where the parity control indicates a negative assertion, the group of signals are inverted prior to being passed through.

In some embodiments of the present invention, the overall number of signal transitions occurring on bus lines is assured to be less than N/2, where N is the width of the data bus (or signals of the bus) that are subject to inversion. This is assured where bus inversions are implemented and where the particular control signal doubling as the polarity signal has a sufficiently low assertion frequency. This is done by deliberately causing more than N/2 transitions to occur on the bus lines when the chosen particular control signal is in a less likely state, and by causing that N/2 transitions or less occur on the bus lines when the chosen control signal is in its more likely state. As used herein, the phrase 'more likely state' is used in its broadest sense to mean an assertion level for a signal that is at least as likely as the opposite assertion level for the same signal. Thus, where for example a signal is asserted twenty percent of the time at a logic '1' level and the other eighty percent of the time at a logic '0' state, the logic '0' state is the more likely state. Conversely, as used herein, the phrase 'less likely state' is used in its broadest sense to mean an assertion level for a signal that is less likely as the opposite assertion level for the same signal. Thus, for the same example of a signal asserted twenty percent of the time at a logic '1' level and the other eighty percent of the time at a logic '0' state, the logic '1' state is the less likely state.

Turning to FIG. 1a, a low power bus system 100 in accordance with various embodiments of the present invention is depicted. Low power bus system 100 includes a bus encoder 133 and a bus decoder 191 that are capable of receiving information from a module 111 that includes a standard bus protocol module 141 and other logic 121. In particular, bus encoder 133 receives a data word 104 and a particular control 102 from standard bus 141. Based on this received input, bus encoder 133 drives an encoded data word 124 and an encoded low frequency control 122. The encoding performed by bus encoder 133 operates to reduce power consumption, and is described in detail below.

Standard bus protocol module 141 includes any circuitry associated with receiving and/or sending signals across a bus. Thus, standard bus protocol module may be, but is not limited to, an NRZ bus used in relation to read channel devices, a standard PCI bus used in relation to personal computers, and/or the like. Based on the disclosure provided herein, one of ordinary skill in the art will recognize a myriad of busses to which embodiments of the present invention may be applied. Alternatively, based on the disclosure provided herein, one of ordinary skill in the art will recognize that embodiments of the present invention may be applied to custom buses that are not generally used. Thus, one of ordinary skill in the art will recognize that the use of the phrase "standard bus" is not limiting, but rather simply indicates any conceivable bus protocol that may be modified in accordance with one or more embodiments of the present invention.

Particular control 102 may be any bus control signal. Thus, using a standard PCI bus as an example, the bus clock signal may be chosen as particular control 102 in theory. However, increased power savings may be achieved where particular control 102 transitions at a very low frequency relative to data word 104. Thus, a control signal that has a lower transition frequency than another control signal may be a better choice for use as particular control 102 because the reduced transition frequency will offer a greater possibility of power reduction. Using the same standard PCI bus example, the aforementioned clock signal may be a poor choice; and a better choice for particular control 102 may be, for example, the FRAME signal. In some cases, particular control 102 is chosen such that it has a transition frequency that averages less than the transition frequency of data word 104. In various cases, particular control 102 is chosen such that it has a transition frequency that averages less than one half the transition frequency of data word 104, and in yet other cases it is chosen such that it has a transition frequency that averages less than ten percent of the transition frequency of data word 104.

As just some examples of control signals that may be useful as particular control 102, where the data bus is a ten bit NRZ data bus common to read channel chips, data word 104 may be the data bits from the bus and particular control 102 may be the erasure pointer. The erasure pointer typically has a transition frequency substantially less than ten percent of the average transition frequency of the data being transferred on the NRZ bus. As another example, where the data bus is a PCI data bus common to personal computers, data word 104 may be the data bits of the PCI data bus (thirty-two or sixty-four bits depending upon the version) and particular control 102 may be the FRAME signal associated with the PCI bus. As yet another example, for a Z-bus tailored for transferring digitized video that includes a sixteen bit data word and a line sync and frame sync signal, data word 104 may be the sixteen bit data word and particular control 102 may be either the line sync or frame sync signal. For a 640×480 frame size, the line sync transitions at 1/640 of the maximum rate of transition for the data word. Thus, line sync would make a reasonable choice for particular control 102. However, as the frame sync signal transitions only once for every 480 transitions of the line sync, it may be a better choice from a power reduction perspective.

Bus decoder 191 receives encoded data word 124 and encoded low frequency control 122, and decodes the received information. The decoded information is provided to standard bus 141 as a data word 174 and a particular control 172. Particular control 172 is simply the received version of particular control 102. This allows for a bi-directional control signal. Thus, for example, where particular control 102 is the outgoing FRAME signal on a PCI bus, particular signal 172 is the received version of the same signal. The decoding provided by bus decoder 191 is substantially the reverse of the encoding provided by bus encoder 133, and is described in detail below.

Figure 1B:
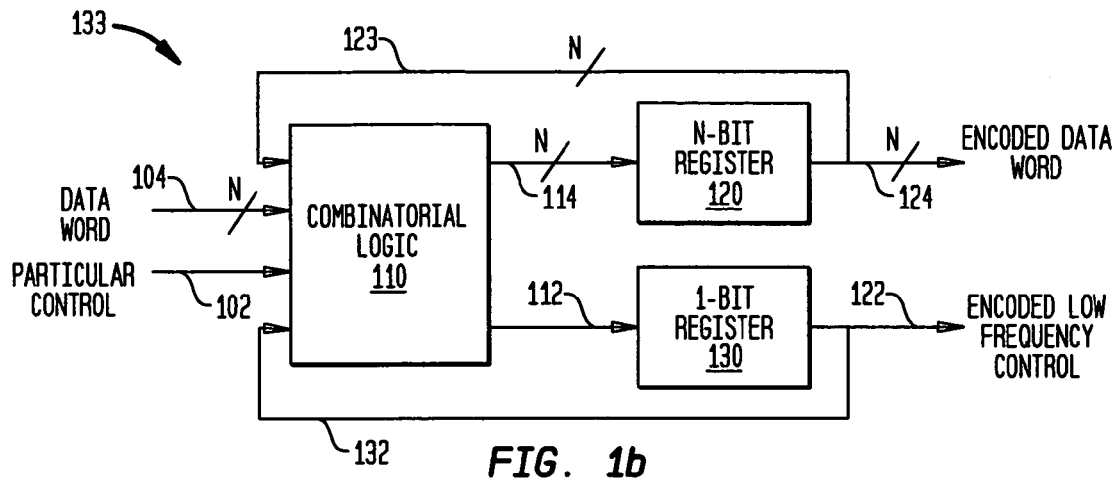
FIG. 1b is a block diagram of a low power bus encoder in accordance with some embodiments of the present invention.

Turning to FIG. 1b, a block diagram of bus encoder 133 is depicted. Bus encoder 133 includes a combinatorial logic block 110, a one bit register 130 and an N-bit register 120. "N" represents the number of bits included in the received data word 104, and may be any number of bits. Thus, N may be, but is not limited to, eight bits, sixteen bits, thirty-two bits, sixty-four bits or one hundred, twenty-eight bits. Based on the disclosure provided herein, one of ordinary skill in the art will recognize a variety of bit counts (including odd or even bit counts) that may be used depending upon standard bus 141. Combinatorial logic block 110 provides an unregistered encoded data word 114, and an unregistered encoded low frequency control 112.

One bit register 130 latches the value provided on unregistered encoded low frequency control 112, and provides encoded low frequency control 122 provided to an external bus. In addition, one bit register 130 provides a copy 132 of encoded low frequency control 122 to combinatorial logic block 110. It should be noted that one bit register 130 may be any device or circuit capable of receiving an input signal and maintaining the input signal for a prescribed time period. Thus, as just one example, one bit register 130 may be a common D flip-flop. Based on the disclosure provided herein, one of ordinary skill in the art will recognize other devices that may be used to implement one bit register 130.

Similarly, N-bit register 120 latches the value provided on unregistered encoded data word 114, and provides encoded data word 124 to an external bus. In addition, N-bit register 120 provides a copy 123 of encoded data word 124 to combinatorial logic block 110. It should be noted that N-bit register 120 may be any device or circuit capable of receiving one or more input signals maintaining the input signal(s) for a prescribed time period. Thus, as just one example, N-bit register 120 may be a parallel grouping of "N" D flip-flops. Based on the disclosure provided herein, one of ordinary skill in the art will recognize other devices that may be used to implement N-bit register 120.

In operation, combinatorial logic block 110 receives data word 104 and particular control 102 from standard bus 141. Data word 104 and particular control 102 represent the data bus values that would be provided externally if power savings in accordance with embodiments of the present invention was not offered. In addition, combinatorial logic block 110 receives encoded data word 124 from N-bit register 120 and encoded low frequency control 122 from one bit register 122. From the perspective of combinatorial logic block 110, encoded data word 124 and encoded low frequency control 122 represent the values provided on a prior external bus transmission. Such information is used by combinatorial logic block 110 to encode data word 104 and particular control 102 to minimize transitions on the external bus, and thereby to reduce dynamic power consumption associated with the external bus.

Encoding provided by combinatorial logic block 110 is set forth in Tables 1-8 below. In particular, Tables 1-4 show exemplary scenarios where particular control 102 is not asserted (i.e., for this case 'not asserted' is indicated by a logic '1' state). Where the frequency of assertion for particular control 102 is low, these scenarios are the most likely. In these scenarios, combinatorial logic block 110 operates to assure that there are never more than N/2 transitions on the N+1 bus lines (i.e., unregistered encoded data word 114 combined with unregistered encoded low frequency control 112). Where the number of transitions is reduced, dynamic power consumption on the bus is reduced. For this particular embodiment, the number of transitions is reduced for the scenarios where particular control is de-asserted. The cost of reducing transitions during the de-asserted state of particular control 102 is a potential increase in the number of transitions occurring where particular control 102 is asserted. As the frequency of assertion of particular control 102 is assumed to be relatively low, a net power reduction is achieved. Also, it should be noted that for Tables 1-8 the asserted state of particular control 102 is assumed to be a logic '1' state, but that other embodiments of the present invention may be applied where assertion of particular control is a logic '0' state. Further, in other embodiments where particular control is asserted for periods that a larger than the periods in which it is de-asserted, the scenarios described in relation to Tables 1-8 may be reversed such that the reduced number of bus transitions occur when particular control 102 is asserted, rather than when it is de-asserted. Such an approach may be particularly useful where a PCI bus is being used in the FRAME signal is being used for particular control 102. Based on the disclosure provided herein, one of ordinary skill in the art will appreciate a variety of embodiments using ideas disclosed herein to reduce dynamic power consumption.

Turning to Table 1, encoding based on an exemplary four bit data bus is shown for the scenario where the difference between data word 104 (the next bus state) and encoded data word 124 (the prior bus state) represents fewer than N/2 transitions, and where particular control 102 is not asserted.

TABLE 1

| | | Less Than N/2 Transitions, Particular Control De-asserted | | | |
|---|---|---|---|---|---|
| Bus | | Data Word 104 and Control 102 | Encoded Data Word 124 and Encoded Low Frequency Control 122 | Unregistered Encoded Information 114, 112 | Decoded Data Word 174 and Control 172 |
| Four Bit Data Bus | Data 3 | 0 | 0 | 0 | 0 |
| | Data 2 | 0 | 0 | 0 | 0 |
| | Data 1 | 1 | 0 | 1 | 1 |
| | Data 0 | 1 | 1 | 1 | 1 |
| Single Bit Low Frequency Control Signal | Particular Control 102/172 | 0 | N/A | 0 | 0 |
| | Polarity Control | 0 | N/A | 0 | N/A |

As can be seen from Table 1, the number of transitions between data word 104 and encoded data word 124 is one (Data 1 is transitioning from 0 to 1). In this case where N is four total bits, the number of transitions is less than N/2. Further, particular control 102 is intended to be de-asserted as represented by the logic state '0'. In such a case, combinatorial logic block 110 passes data word 104 directly through unmodified as unregistered encoded data word 114. In addition, combinatorial logic block 110 sets an internal polarity control bit to a logic '0' indicating that the encoded data is not inverted. This polarity control bit is passed through as unregistered encoded low frequency control 112. It should be noted that the polarity control signal is the same logic state as that of particular control 102, and thus no decoding of particular control by the receiving device is required. In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 1.

Table 2 shows the encoding based on the same exemplary four bit data bus, and applied where the difference between data word 104 (the next bus state) and encoded data word 124 (the prior bus state) represents greater than N/2 transitions, and where particular control 102 is not asserted.

TABLE 2

Greater Than N/2 Transitions, Particular Control De-asserted

| Bus | | Data Word 104 and Control 102 | Encoded Data Word 124 and Encoded Low Frequency Control 122 | Unregistered Encoded Information 114, 112 | Decoded Data Word 174 and Control 172 |
|---|---|---|---|---|---|
| Four Bit Data Bus | Data 3 | 0 | 1 | 1 | 0 |
| | Data 2 | 1 | 0 | 0 | 1 |
| | Data 1 | 1 | 0 | 0 | 1 |
| | Data 0 | 1 | 1 | 0 | 1 |
| Single Bit Low Frequency Control Signal | Particular Control 102/172 | 0 | N/A | 0 | 0 |
| | Polarity Control | 1 | N/A | | N/A |

As can be seen from Table 2, the number of transitions between data word 104 and encoded data word 124 is three (Data 1 is transitioning from '0' to '1'; Data 2 is transitioning from '0' to '1'; and Data 3 is transitioning from '1' to '0'). In this case where N is four total bits, the number of transitions is greater than N/2. Further, particular control 102 is intended to be de-asserted as represented by the logic state '0'. In such a case, combinatorial logic block 110 inverts data word 104 and provides the inverted word as unregistered encoded data word 114. In addition, combinatorial logic block 110 sets an internal polarity control bit to a logic '1' indicating that the encoded data is inverted. This polarity control bit is passed through as unregistered encoded low frequency control 112. It should be noted that the polarity control signal exhibits a different logic state than that of particular control 102, and thus it must be decoded by the receiving device. By inverting data word 104, fewer than N/2 transitions occur and the dynamic power consumption on the external data bus is reduced. In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 2.

Table 3 shows the encoding based on the same exemplary four bit data bus, and applied where the difference between data word 104 (the next bus state) and encoded data word 124 (the prior bus state) represents exactly N/2 transitions, and where particular control 102 is not asserted, and was not previously asserted (i.e., particular control 102 is not asserted, and encoded low frequency control 122 is not asserted).

TABLE 3

Exactly N/2 Transitions, Particular Control De-asserted

| Bus | | Data Word 104 and Control 102 | Encoded Data Word 124 and Encoded Low Frequency Control 122 | Unregistered Encoded Information 114, 112 | Decoded Data Word 174 and Control 172 |
|---|---|---|---|---|---|
| Four Bit Data Bus | Data 3 | 1 | 1 | 1 | 1 |
| | Data 2 | 0 | 0 | 0 | 0 |
| | Data 1 | 1 | 0 | 1 | 1 |
| | Data 0 | 0 | 1 | 0 | 0 |
| Single Bit Low Frequency Control Signal | Particular Control 102/172 | 0 | 0 | 0 | 0 |
| | Polarity Control | 1 | N/A | | N/A |

As can be seen from Table 3, the number of transitions between data word 104 and encoded data word 124 is two (Data 1 is transitioning from '0' to '1'; and Data 0 is transitioning from '1' to '0'). In this case where N is four total bits, the number of transitions is exactly equal to N/2. For such a situation, combinatorial logic block 110 examines the combination of encoded data word 124, encoded low frequency control 122, data word 104, and particular control 102 to determine an output that results in exactly N/2 transitions occurring on the N+1 output lines (i.e., unregistered encoded data word 114 combined with unregistered encoded low frequency control 112). Thus, in this case where particular control 102 is de-asserted and was not previously asserted, combinatorial logic block 110 passes data word 104 directly through unmodified as unregistered encoded data word 114. In addition, combinatorial logic block 110 sets an internal polarity control bit to a logic '0' indicating that the encoded data is not inverted. This polarity control bit is passed through as unregistered encoded low frequency control 112. In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 3.

Table 4 shows the encoding based on the same exemplary four bit data bus, and applied where the difference between data word 104 (the next bus state) and encoded data word 124 (the prior bus state) represents exactly N/2 transitions, and where particular control 102 is not asserted, but was previously asserted (i.e., particular control 102 is not asserted, and encoded low frequency control 122 is asserted).

TABLE 4

Exactly N/2 Transitions, Particular Control Asserted

| Bus | | Data Word 104 and Control 102 | Encoded Data Word 124 and Encoded Low Frequency Control 122 | Unregistered Encoded Information 114, 112 | Decoded Data Word 174 and Control 172 |
|---|---|---|---|---|---|
| Four Bit Data Bus | Data 3 | 1 | 1 | 0 | 1 |
| | Data 2 | 0 | 0 | 1 | 0 |
| | Data 1 | 1 | 0 | 0 | 1 |
| | Data 0 | 0 | 1 | 1 | 0 |
| Single Bit Low Frequency Control | Particular Control 102/172 | 0 | 1 | 1 | 0 |
| Signal | Polarity Control | 1 | N/A | | N/A |

As can be seen from Table 4, the number of transitions between data word 104 and encoded data word 124 is two (Data 1 is transitioning from '0' to '1'; and Data 0 is transitioning from '1' to '0'). In this case where N is four total bits, the number of transitions is exactly equal to N/2. For such a situation, combinatorial logic block 110 examines the combination of encoded data word 124, encoded low frequency control 122, data word 104, and particular control 102 to determine an output that results in exactly N/2 transitions occurring on the N+1 output lines (i.e., unregistered encoded data word 114 combined with unregistered encoded low frequency control 112). Thus, in this case where particular control 102 is not asserted and was previously asserted, combinatorial logic block 110 inverts data word 104 and provides the inverted word as unregistered encoded data word 114. In addition, combinatorial logic block 110 sets an internal polarity control bit to a logic '1' indicating that the encoded data is inverted. This polarity control bit is passed through as unregistered encoded low frequency control 112. It should be noted that the polarity control signal exhibits a different logic state than that of particular control 102, and thus it must be decoded by the receiving device. In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 4.

Tables 5-8 show scenarios where particular control 102 is asserted. In these scenarios, combinatorial logic block 110 assures that there are always more than N/2 transitions on the bus lines (i.e., unregistered encoded data word 114 combined with unregistered encoded low frequency control 112). As will be appreciated by one of ordinary skill in the art, increasing the number of transitions to greater than N/2 transitions results in an increase in dynamic power consumption. However, as previously suggested, where the assertion rate of particular control 102 is relatively low, a net reduction in dynamic power consumption is achieved even though the scenarios shown in Tables 5-8 may result in an increased power consumption.

Table 5 shows the encoding based on the same exemplary four bit data bus, and applied where the difference between data word 104 (the next bus state) and encoded data word 124 (the prior bus state) represents fewer than N/2 transitions, and where particular control 102 is asserted.

TABLE 5

Less Than N/2 Transitions, Particular Control Asserted

| Bus | | Data Word 104 and Control 102 | Encoded Data Word 124 and Encoded Low Frequency Control 122 | Unregistered Encoded Information 114, 112 | Decoded Data Word 174 and Control 172 |
|---|---|---|---|---|---|
| Four Bit Data Bus | Data 3 | 0 | 0 | 1 | 0 |
| | Data 2 | 0 | 0 | 1 | 0 |
| | Data 1 | 0 | 0 | 1 | 0 |
| | Data 0 | 0 | 1 | 1 | 0 |
| Single Bit Low Frequency Control | Particular Control 102/172 | 1 | N/A | 1 | 1 |
| Signal | Polarity Control | 1 | N/A | | N/A |

As can be seen from Table 5, the number of transitions between data word 104 and encoded data word 124 is 1 (Data 0 is transitioning from '1' to '0'). In this case where N is four total bits, the number of transitions is less than N/2. Further, particular control 102 is intended to be asserted as represented by the logic state '1'. In such a case, combinatorial logic block 110 inverts data word 104 and provides the inverted word as unregistered encoded data word 114. In addition, combinatorial logic block 110 sets an internal polarity control bit to a logic '1' indicating that the encoded data is inverted. This polarity control bit is passed through as unregistered encoded low frequency control 112. In this case, the polarity control signal exhibits the same logic state as that of particular control 102, and thus does not need to be decoded by the receiving device. In contrast to shat described in relation to Table 2 above, by inverting data word 104, greater than N/2 transitions occur and the dynamic power consumption on the external data bus is actually increased. Again, where the assertion rate of particular control 102 is relatively low, a net reduction in dynamic power consumption is achieved even though this particular scenario results in an increased power consumption.

In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 5.

Table 6 shows the encoding based on the same exemplary four bit data bus, and applied where the difference between data word 104 (the next bus state) and encoded data word 124 (the prior bus state) represents fewer than N/2 transitions, and where particular control 102 is asserted.

As can be seen from Table 6, the number of transitions between data word 104 and encoded data word 124 is three (Data 1 is transitioning from '0' to '1'; Data 2 is transitioning from '0' to '1'; and Data 3 is transitioning from '0' to '1'). In this case where N is four total bits, the number of transitions is greater than N/2. Further, particular control 102 is intended to be asserted as represented by the logic state '1'. In such a case, combinatorial logic block 110 passes data word 104 directly through unmodified as unregistered encoded data word 114. In addition, combinatorial logic block 110 sets an internal polarity control bit to a logic '0' indicating that the encoded data is not inverted. This polarity control bit is passed through as unregistered encoded low frequency control 112. It should be noted that the polarity control signal exhibits a different logic state than that of particular control 102, and thus it must be decoded by the receiving device. In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 6.

Table 7 shows the encoding based on the same exemplary four bit data bus, and applied where the difference between data word 104 (the next bus state) and encoded data word 124 (the prior bus state) represents exactly N/2 transitions, and where particular control 102 is asserted, but was not previously asserted (i.e., particular control 102 is asserted, and encoded low frequency control 122 is not asserted).

TABLE 6

Greater Than N/2 Transitions, Particular Control Asserted

| Bus | | Data Word 104 and Control 102 | Encoded Data Word 124 and Encoded Low Frequency Control 122 | Unregistered Encoded Information 114, 112 | Decoded Data Word 174 and Control 172 |
|---|---|---|---|---|---|
| Four Bit Data Bus | Data 3 | 1 | 0 | 1 | 1 |
| | Data 2 | 1 | 0 | 1 | 1 |
| | Data 1 | 1 | 0 | 1 | 1 |
| | Data 0 | 1 | 1 | 1 | 1 |
| Single Bit Low Frequency Control Signal | Particular Control 102/172 | 1 | N/A | 0 | 1 |
| | Polarity Control | 0 | N/A | N/A | N/A |

TABLE 7

Exactly N/2 Transitions, Particular Control Asserted

| Bus | | Data Word 104 and Control 102 | Encoded Data Word 124 and Encoded Low Frequency Control 122 | Unregistered Encoded Information 114, 112 | Decoded Data Word 174 and Control 172 |
|---|---|---|---|---|---|
| Four Bit Data Bus | Data 3 | 1 | 1 | 0 | 1 |
| | Data 2 | 0 | 0 | 1 | 0 |
| | Data 1 | 1 | 0 | 0 | 1 |
| | Data 0 | 0 | 1 | 1 | 0 |
| Single Bit Low Frequency Control Signal | Particular Control 102/172 | 1 | 0 | 1 | 1 |
| | Polarity Control | 1 | N/A | | N/A |

As can be seen from Table 7, the number of transitions between data word 104 and encoded data word 124 is two (Data 1 is transitioning from '0' to '1'; and Data 0 is transitioning from '1' to '0'). In this case where N is four total bits, the number of transitions is exactly equal to N/2. For such a situation, combinatorial logic block 110 examines the combination of encoded data word 124, encoded low frequency control 122, data word 104, and particular control 102 to determine an output that results in exactly (N/2+1) transitions occurring on the N+1 output lines (i.e., unregistered encoded data word 114 combined with unregistered encoded low frequency control 112). Thus, in this case where particular control 102 is asserted, combinatorial logic block 110 inverts data word 104 and provides the inverted word as unregistered encoded data word 114. In addition, combinatorial logic block 110 sets an internal polarity control bit to a logic '1' indicating that the encoded data is inverted. This polarity control bit is passed through as unregistered encoded low frequency control 112. It should be noted that the polarity control signal exhibits the same logic state as that of particular control 102, and thus it does not need to be decoded by the receiving device. In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 7.

Table 8 shows the encoding based on the same exemplary four bit data bus, and applied where the difference between data word 104 (the next bus state) and encoded data word 124 (the prior bus state) represents exactly N/2 transitions, and where particular control 102 is asserted, and was previously asserted.

TABLE 8

Exactly N/2 Transitions, Particular Control Asserted

| Bus | | Data Word 104 and Control 102 | Encoded Data Word 124 and Encoded Low Frequency Control 122 | Unregistered Encoded Information 114, 112 | Decoded Data Word 174 and Control 172 |
|---|---|---|---|---|---|
| Four Bit Data Bus | Data 3 | 1 | 1 | 1 | 1 |
| | Data 2 | 0 | 0 | 0 | 0 |
| | Data 1 | 1 | 0 | 1 | 1 |
| | Data 0 | 0 | 1 | 0 | 0 |
| Single Bit Low Frequency Control Signal | Particular Control 102/172 | 1 | 1 | 0 | 1 |
| | Polarity Control | 1 | N/A | | N/A |

As can be seen from Table 8, the number of transitions between data word 104 and encoded data word 124 is two (Data 1 is transitioning from '1' to '0'; and Data 0 is transitioning from '1' to '0'). In this case where N is four total bits, the number of transitions is exactly equal to N/2. For such a situation, combinatorial logic block 110 examines the combination of encoded data word 124, encoded low frequency control 122, data word 104, and particular control 102 to determine an output that results in exactly (N/2+1) transitions occurring on the N+1 output lines (i.e., unregistered encoded data word 114 combined with unregistered encoded low frequency control 112). Thus, in this case where particular control 102 is de-asserted, combinatorial logic block 110 passes data word 104 directly through unmodified as unregistered encoded data word 114. In addition, combinatorial logic block 110 sets an internal polarity control bit to a logic '0' indicating that the encoded data is not inverted. This polarity control bit is passed through as unregistered encoded low frequency control 112. It should be noted that the polarity control signal exhibits a different logic state as that of particular control 102, and thus must be decoded by the receiving device. In turn, unregistered encoded data word 114 is latched by N-bit register 120 and provided to an external data bus as the next encoded data word 124. Similarly, unregistered encoded low frequency control 112 is latched by one bit register 130 and provided to an external data bus as the next low frequency control 122. These next encoded information are decoded by a receiving device as represented by the far right column of Table 8.

Based on the foregoing discussion of Tables 1-8, the following Table 9 shows generic pseudo-code describing the operation of combinatorial logic block 110:

TABLE 9

Pseudo-Code for Combinatorial Logic Block 110

```
/* Power Reduction Scenarios */
If (particular control 102 == 'more likely state') {
    If (difference between data word 104 and encoded data word
    124 < N/2 transitions) {
        unregistered encoded data word 114 = data word 104;
        unregistered encoded low frequency control 112 = 'more
        likely state'}
    Else If (difference between data word 104 and encoded data word
    124 > N/2 transitions) {
        unregistered encoded data word 114 = (INVERTED) data word
        104;
        unregistered encoded low frequency control 112 = 'less
        likely state'}
    Else If (difference between data word 104 and encoded data word
    124 == N/2 transitions) {
        If (encoded low frequency control 122 == 'more likely state')
        {
            unregistered encoded data word 114 = data word 104;
            unregistered encoded low frequency control 112 = 'more
            likely state' }
        Else If (encoded low frequency control 122 == 'less likely
        state') {
            unregistered encoded data word 114 = (INVERTED) data
            word 104;
            unregistered encoded low frequency control 112 = 'less
            likely state' }
    }
}
/* Power Increase Scenarios */
Else If (particular control 102 == 'less likely state') {
    If (difference between data word 104 and encoded data word
    124 < N/2 transitions) {
        unregistered encoded data word 114 = (INVERTED) data word
        104;
        unregistered encoded low frequency control 112 = 'less
        likely state'}
    Else If (difference between data word 104 and encoded data word
    124 > N/2 transitions) {
        unregistered encoded data word 114 = data word 104;
        unregistered encoded low frequency control 112 = 'more
        likely state'}
    Else If (difference between data word 104 and encoded data word
    124 == N/2 transitions){
        If (encoded low frequency control 122 == 'more likely state')
        {
            unregistered encoded data word 114 = (INVERTED) data
            word 104;
            unregistered encoded low frequency control 112 = 'less
            likely state' }
        Else If (encoded low frequency control 122 == 'less likely
        state') {
            unregistered encoded data word 114 = data word 104;
            unregistered encoded low frequency control 112 = 'more
            likely state' }
    }
}
```

Figure 1C:
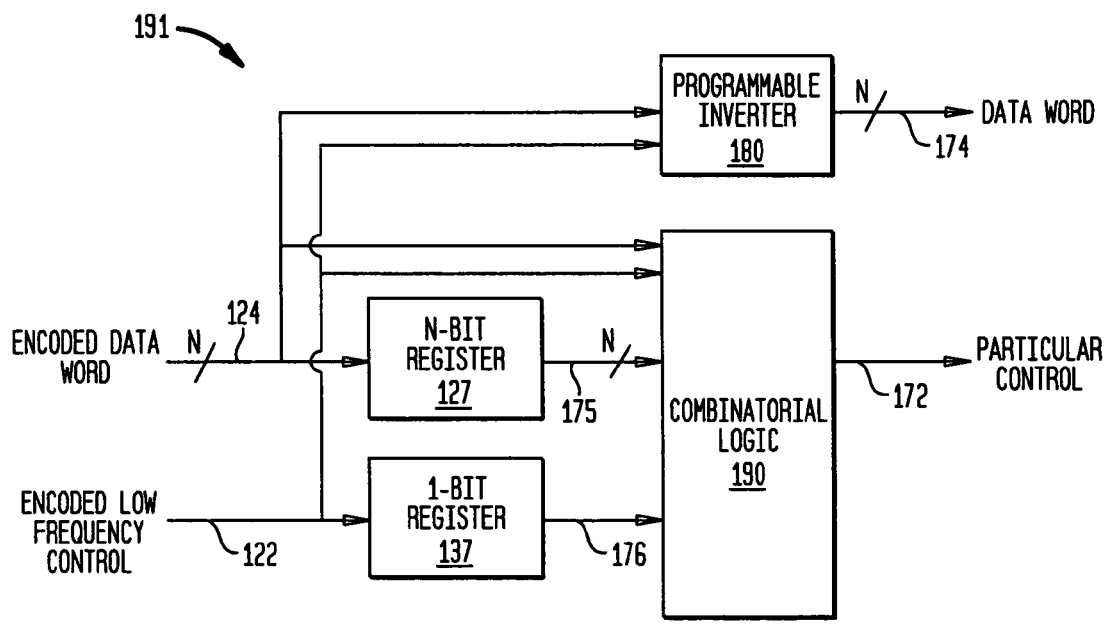
FIG. 1c is a block diagram of a low power bus decoder in accordance with one or more embodiments of the present invention.

Turning now to FIG. 1c, a block diagram of bus decoder 191 is depicted. Bus decoder 191 includes a combinatorial logic block 190, a programmable inverter 180, a one bit register 137 and an N-bit register 127. Similar to bus encoder 133, "N" represents the number of bits included in the received encoded data word 124, and may be any number of bits. Thus, N may be, but is not limited to, eight bits, sixteen bits, thirty-two bits, sixty-four bits or one hundred, twenty-eight bits. Based on the disclosure provided herein, one of ordinary skill in the art will recognize a variety of bit counts that may be used depending upon standard bus 141. Combinatorial logic block 190 provides a decoded data word 174, and a decoded particular control 172.

One bit register 137 latches the value provided from the external bus as encoded low frequency control 122, and provides a registered low frequency control 176 to combinatorial logic block 190. It should be noted that one bit register 137 may be any device or circuit capable of receiving an input signal and maintaining the input signal for a prescribed time period. Thus, as just one example, one bit register 137 may be a common D flip-flop. Based on the disclosure provided herein, one of ordinary skill in the art will recognize other devices that may be used to implement one bit register 137.

Similarly, N-bit register 127 latches the value provided from the external bus as encoded data word 124, and provides a registered encoded data word 175 to combinatorial logic block 190. It should be noted that N-bit register 127 may be any device or circuit capable of receiving one or more input signals maintaining the input signal(s) for a prescribed time period. Thus, as just one example, N-bit register 127 may be a parallel grouping of "N" D flip-flops. Based on the disclosure provided herein, one of ordinary skill in the art will recognize other devices that may be used to implement N-bit register 127.

Programmable inverter 180 is operable to receive encoded data word 124 and to selectively invert each individual bit thereof based on encoded low frequency control 122. Thus, where encoded low frequency control 122 indicates that the polarity of encoded data word 124 is to be inverted, programmable inverter 180 provides an inverted data word 174. Otherwise, programmable inverter 180 provides encoded data word 124 unmodified as data word 174. In one particular embodiment where a logic '1' on encoded low frequency word 122 indicates a change in polarity, programmable inverter 180 may be implemented as a parallel group of 'N' XOR gates. Based on the disclosure provided herein, one of ordinary skill in the art will recognize other implementations that may be used depending upon the assertion level of encoded low frequency control 122.

Combinatorial logic block 190 receives registered encoded data word 175 and registered encoded low frequency control 176. Based on these inputs, combinatorial logic block 190 provides particular control 172 to the state it would have been had it not been encoded to perform its additional role as polarity control. Thus, reversing the logic of the pseudo-code of Table 9, combinatorial logic block 190 may be implemented in accordance with the pseudo-code of Table 10 below.

TABLE 10

Pseudo-Code for Combinatorial Logic Block 190

```
/* Decoding of Tables 1-2 above */
If (difference between encoded data word 124 and registered encoded
    data word 175 < N/2 transitions)
{
            particular control 172 = 'more likely state'
}
/* Decoding of Tables 5-6 above */
Else If (difference between encoded data word 124 and registered
```

TABLE 10-continued

Pseudo-Code for Combinatorial Logic Block 190

```
            encoded data word 175 > N/2 transitions)
    {
            particular control 172 = 'less likely state'
    }
    Else If (difference between encoded data word 124 and registered
            encoded data word 175 == N/2 transitions)
    {
        If (registered encoded low frequency control 176 == 'more likely
            state') {
                /* Decoding Table 3 above */
                If (encoded low frequency control 122 == 'more
                likely state') {
                        particular control 172 = 'more likely state'}
                /* Decoding Table 7 above */
                Else If (encoded low frequency control 122 == 'less
                likely state') {
                        particular control 172 = 'less likely state'}
        }
        Else If (registered encoded low frequency control 176 == 'less
            likely state') {
                /* Decoding Table 4 above */
                If (encoded low frequency control 122 == 'more
                likely state') {
                        particular control 172 = 'more likely state'}
                /* Decoding Table 8 above */
                Else If (encoded low frequency control 122 == 'less
                likely state') {
                        particular control 172 = 'less likely state'}
        }
    }
}
```

Figure 2:
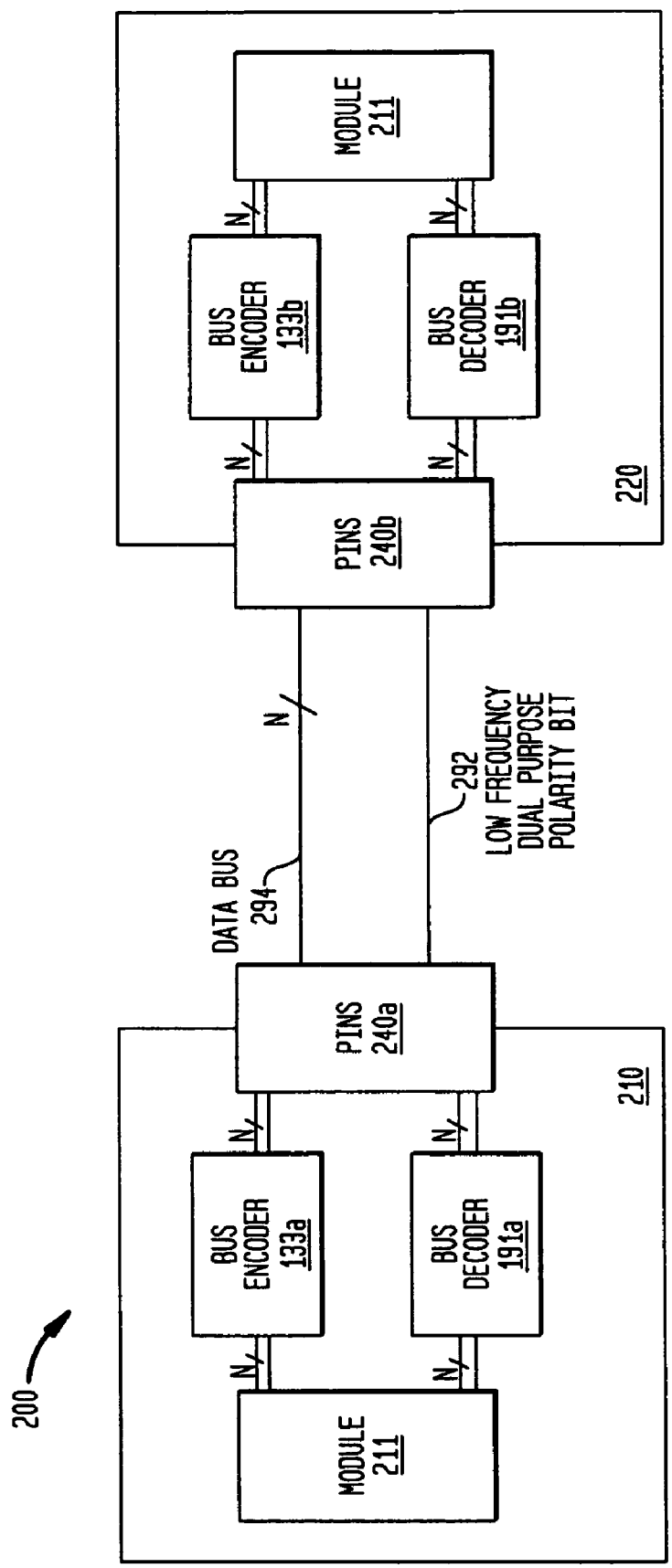
FIG. 2 is a block diagram of a multi chip system including a low power bus system in accordance with various embodiments of the present invention.

Turning now to FIG. 2, a block diagram is depicted of a multi-chip system 200 including a low power bus system in accordance with various embodiments of the present invention. Multi-chip system 200 includes two chips 210, 280 that each include bus encoders 133 and bus decoders 191. In addition, each of chips 210, 280 include I/O pins 240 and modules 211, 221 implementing the particular functionality of the respective chip. Chips 210, 220 are connected via a bus that includes a data bus 294 and a low frequency dual purpose polarity bit 292. Module 211 and 221 perform the functionality described above in relation to module 111. Further, data bus 294 would typically be connected to encoded data word 124 that is electrically coupled to both bus encoders 133 and bus decoders 191. Low frequency dual purpose polarity bit 292 would typically be connected to encoded low frequency control 122 that is also electrically coupled to both bus encoders 133 and bus decoders 191. As shown, multi-chip system 200 offers an approach whereby a low power bus can be implemented between two existing chip designs with only limited modifications to the designs. Based on the disclosure provided herein, one of ordinary skill in the art will recognize a variety of chips, circuits, and/or systems to which embodiments of the present invention may be applied. Further, one of ordinary skill in the art will recognize connection approaches and design implementations that may be desirable depending upon the particular design constraints.

In conclusion, the present invention provides novel systems, methods and arrangements for error reduction. While detailed descriptions of one or more embodiments of the invention have been given above, various alternatives, modifications, and equivalents will be apparent to those skilled in the art without varying from the spirit of the invention. For example, embodiments may be created that include combinatorial logic blocks 110, 190 that consider not only the previous bus state, but two or more previous bus states to further minimize the total number of transitions between bus states. Alternatively, or in addition, general classes of coding schemes termed Transition Pattern Coding may be used to further reduce power consumption. As yet another example, embodiments of the present invention may be applied to any number of particular controls, and operate on any number of more likely states of such particular controls. Therefore, the above description should not be taken as limiting the scope of the invention, which is defined by the appended claims.

What is claimed is:

1. A method for power reduction in a semiconductor device, the method comprising:
providing a semiconductor device, wherein the semiconductor device includes a bus, wherein the bus includes a group of signals and a control signal associated with the group of signals, wherein the control signal doubles as an active particular control and a polarity control simultaneously, wherein the polarity control indicates a polarity state of the group of signals, and wherein particular control indicates a bus control;
determining a number of state transitions occurring on the group of signals; and
encoding the group of signals to form an encoded group of signals, wherein encoding the group of signals is based at least in part on the number of state transitions occurring on the group of signals, and wherein the encoded group of signals reflects the state of the polarity control.

2. The method of claim 1, wherein the particular control has a more likely state and a less likely state, and wherein the method further comprises:
determining a set of conditions, wherein the set of conditions includes at least:
(a) that the particular control is asserted in the more likely state; and
(b) that the number of state transitions occurring on the group of signals is less than half of the number of signals included in the group of signals; and
based at least in part on the set of conditions, asserting the control signal in the more likely state; wherein encoding the group of signals includes passing the group of signals through unmodified as the encoded group of signals.

3. The method of claim 1, wherein the particular control has a more likely state and a less likely state, and wherein the method further comprises:
determining a set of conditions, wherein the set of conditions includes at least:
(a) that the particular control is asserted in the more likely state; and
(b) that the number of state transitions occurring on the group of signals is greater than half of the number of signals included in the group of signals; and
based at least in part on the set of conditions, asserting the control signal in the less likely state; wherein encoding the group of signals includes inverting each signal in the group of signals to form an inverted signal group, and providing the inverted signal group as the encoded group of signals.

4. The method of claim 1, wherein the particular control has a more likely state and a less likely state, and wherein the method further comprises:
determining a set of conditions, wherein the set of conditions includes at least:
(a) that the particular control is currently asserted in the more likely state;
(b) that the particular control was asserted in the more likely state during a preceding period; and
(c) that the number of state transitions occurring on the group of signals is equal to half of the number of signals included in the group of signals; and based at least in part on the set of conditions, asserting the control signal in the more likely state; wherein encoding the group of signals includes passing the group of signals through unmodified as the encoded group of signals.

5. The method of claim 1, wherein the particular control has a more likely state and a less likely state, and wherein the method further comprises:
   determining a set of conditions, wherein the set of conditions includes at least:
      (a) that the particular control is currently asserted in the more likely state;
      (b) that the particular control was asserted in the less likely state during a preceding period; and
      (c) that the number of state transitions occurring on the group of signals is equal to half of the number of signals included in the group of signals; and
   based at least in part on the set of conditions, asserting the control signal in the less likely state; wherein encoding the group of signals includes inverting each signal in the group of signals to form an inverted signal group, and providing the inverted signal group as the encoded group of signals.

6. The method of claim 1, wherein the particular control has a more likely state and a less likely state, and wherein the method further comprises:
   determining a set of conditions, wherein the set of conditions includes at least:
      (a) that the particular control is asserted in the less likely state;
      (b) determining that the number of state transitions occurring on the group of signals is less than half of the number of signals included in the group of signals; and
   based at least in part on the set of conditions, asserting the control signal in the less likely state; wherein encoding the group of signals includes inverting each signal in the group of signals to form an inverted signal group, and providing the inverted signal group as the encoded group of signals.

7. The method of claim 1, wherein the particular control has a more likely state and a less likely state, and wherein the method further comprises:
   determining a set of conditions, wherein the set of conditions includes at least:
      (a) that the particular control is asserted in the less likely state;
      (b) that the number of state transitions occurring on the group of signals is greater than half of the number of signals included in the group of signals; and
   based at least in part on the set of conditions, asserting the control signal in the more likely state; wherein encoding the group of signals includes passing the group of signals through unmodified as the encoded group of signals.

8. The method of claim 1, wherein the particular control has a more likely state and a less likely state, and wherein the method further comprises:
   determining a set of conditions, wherein the set of conditions includes at least:
      (a) that the particular control is currently asserted in the less likely state;
      (b) that the particular control was asserted in the more likely state during a preceding period; and
      (c) that the number of state transitions occurring on the group of signals is equal to half of the number of signals included in the group of signals; and
   based at least in part on the set of conditions, asserting the control signal in the less likely state; wherein encoding the group of signals includes inverting each signal in the group of signals to form an inverted signal group, and providing the inverted signal group as the encoded group of signals.

9. The method of claim 1, wherein the particular control has a more likely state and a less likely state, and wherein the method further comprises:
   determining a set of conditions, wherein the set of conditions includes at least:
      (a) that the particular control is currently asserted in the less likely state;
      (b) that the particular control was asserted in the less likely state during a preceding period; and
      (c) that the number of state transitions occurring on the group of signals is equal to half of the number of signals included in the group of signals; and
   based at least in part on the set of conditions, asserting the control signal in the more likely state; wherein encoding the group of signals includes passing the group of signals through unmodified as the encoded group of signals.

10. The method of claim 1, wherein the method further comprises:
    receiving the encoded group of signals;
    receiving the control signal, wherein the control signal indicates an inverted polarity; and
    based at least in part on the control signal, decoding the encoded group of signals, wherein decoding the encoded group of signals includes inverting each signal in the encoded group of signals.

11. The method of claim 1, wherein the particular control has a more likely state and a less likely state, and wherein the method further comprises:
    receiving the encoded group of signals; receiving the control signal;
    determining a set of conditions, wherein the set of conditions includes at least:
       (a) that the number of state transitions occurring on the group of signals is equal to half of the number of signals included in the group of signals;
       (b) that the control signal was asserted in the more likely state during a preceding period; and
       (c) that the control signal is currently asserted in the more likely state; and
    based at least in part on the set of conditions, asserting the particular control signal in the more likely state.

12. The method of claim 1, wherein the particular control has a more likely state and a less likely state, and wherein the method further comprises:
    receiving the encoded group of signals; receiving the control signal; determining a set of conditions, wherein the set of conditions includes at least:
       (a) that the number of state transitions occurring on the group of signals is equal to half of the number of signals included in the group of signals;
       (b) that the control signal was asserted in the more likely state during a preceding period; and
       (c) that the control signal is currently asserted in the less likely state; and
    based at least in part on the set of conditions, asserting the particular control in the less likely state.

13. The method of claim 1, wherein the particular control has a more likely state and a less likely state, and wherein the method further comprises:

receiving the encoded group of signals; receiving the control signal;

determining a set of conditions, wherein the set of conditions includes at least:
  (a) that the number of state transitions occurring on the group of signals is equal to half of the number of signals included in the group of signals;
  (b) that the control signal was asserted in the less likely state during a preceding period; and
  (c) that the control signal is currently asserted in the more likely state; and based at least in part on the set of conditions, asserting the particular control signal in the more likely state.

14. The method of claim 1, wherein the particular control has a more likely state and a less likely state, and wherein the method further comprises:

receiving the encoded group of signals;
receiving the control signal;
determining a set of conditions, wherein the set of conditions includes at least:
  (a) that the number of state transitions occurring on the group of signals is equal to half of the number of signals included in the group of signals;
  (b) that the control signal was asserted in the less likely state during a preceding period; and
  (c) that the control signal is currently asserted in the less likely state; and based at least in part on the set of conditions, asserting the particular control in the less likely state.

15. The method of claim 1, wherein the group of signals is a group of data signals.

16. An interconnect bus device, wherein the interconnect bus device comprises:

a data bus, wherein the data bus includes a number of data bits;

a control signal associated with the data bus, wherein the control signal indicates a particular control and a polarity control simultaneously, wherein the polarity control indicates a polarity state of the data bus, and wherein particular control indicates a bus control unrelated to the polarity control; and a controller, wherein the controller is operable to:
  determine a number of state transitions occurring on the group of signals;
  encode the data bus to form an encoded group of signals, wherein encoding the group of signals is based at least in part on the number of state transitions occurring on the group of signals, and wherein the encoded group of signals reflects the state of the polarity control; and
  provide the encoded group of signals via the data bus.

17. The interconnect bus device of claim 16, wherein the interconnect bus is implemented in relation to a read channel, wherein the interconnect bus is substantially an NRZ bus, and wherein the particular control is an erasure signal.

18. An interconnect bus device, wherein the interconnect bus comprises:

a data bus, wherein the data bus includes a number of data bits;

a control signal associated with the data bus, wherein the control signal indicates a particular control and a polarity control simultaneously, wherein the polarity control indicates a polarity state of the data bus, and wherein particular control indicates a bus control unrelated to the polarity control; and a controller, wherein the controller is operable to:
  receive an encoded group signals via the data bus;
  receive the control signal;
  determine a number of state transitions occurring on the encoded group of signals;
  decode the control signal based at least in part on the determined number of state transitions occurring on the encoded group of signals; and
  decode the encoded group of signals based at least in part on the control signal.

19. The interconnect bus device of claim 16, wherein the interconnect bus is substantially a PCI bus, and wherein the particular control is a FRAME signal of a standard PCI bus.

20. The method of claim 1, wherein the method further comprises:

receiving the control signal; and
performing an operation dictated by the particular control and performing an inversion dictated by the polarity control during the same period.

21. The interconnect bus device of claim 16, wherein the controller is further operable to:

perform an operation dictated by the particular control and perform an inversion dictated by the polarity control during the same period.

22. The interconnect bus device of claim 16, wherein the particular control has a more likely state, and wherein the controller is further operable to:

determine that the particular control is asserted in the more likely state; and
wherein encoding the data bus to form the encoded group of signals is further based on the more likely state of the particular control.

23. The interconnect bus device of claim 16, wherein the particular control has a more likely state, and wherein the controller is further operable to:

determine that the particular control is asserted in the more likely state during a succeeding period;
determine that the particular control was asserted in the more likely state during a preceding period; and
wherein encoding the data bus to form the encoded group of signals is further based on the more likely state of the particular control in both the succeeding period and the preceding period.

24. The interconnect bus device of claim 16, wherein the particular control has a less likely state, and wherein the controller is further operable to:

determine that the particular control is asserted in the less likely state; and
wherein encoding the data bus to form the encoded group of signals is further based on the less likely state of the particular control.

25. The interconnect bus device of claim 16, wherein the particular control has a less likely state and a more likely state, and wherein the controller is further operable to:

determine that the particular control is asserted in the less likely state during a succeeding period;
determine that the particular control was asserted in the more likely state during a preceding period; and
wherein encoding the data bus to form the encoded group of signals is further based on the more likely state of the particular control in the preceding period and the less likely state in the succeeding period.

26. The interconnect bus device of claim 16, wherein the particular control has a less likely state and a more likely state, and wherein the controller is further operable to:

determine that the particular control is asserted in the less likely state during a succeeding period;
determine that the particular control was asserted in the less likely state during a preceding period; and wherein encoding the data bus to form the encoded group of signals is further based on the less likely state of the particular control in both the preceding period and the succeeding period.

27. The interconnect bus device of claim 18, wherein the particular control has a more likely state, and wherein the controller is further operable to:
  determine that the control signal was asserted in the more likely state during a preceding period;
  determine that the control signal is asserted in the more likely state during a succeeding period; and
  wherein decoding the encoded group of signals is further based on the more likely state of the particular control in both the preceding period and the succeeding period.

28. The interconnect bus device of claim 18, wherein the particular control has a more likely state and a less likely state, and wherein the controller is further operable to:
  determine that the control signal was asserted in the more likely state during a preceding period;
  determine that the control signal is asserted in the less likely state during a succeeding period; and
  wherein decoding the encoded group of signals is further based on the more likely state of the particular control in the preceding period and the less likely state of the particular control during the succeeding period.

* * * * *